US012809465B2

(12) United States Patent
Qi et al.

(10) Patent No.: US 12,809,465 B2
(45) Date of Patent: Nov. 24, 2026

(54) DISPLAY DEVICE AND DRIVING METHOD THEREFOR

(71) Applicants: Beijing BOE Technology Development Co., Ltd., Beijing (CN); BOE Technology Group Co., Ltd., Beijing (CN)

(72) Inventors: Dexing Qi, Beijing (CN); Yongchun Tao, Beijing (CN); Yingzi Wang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 233 days.

(21) Appl. No.: 18/727,640

(22) PCT Filed: May 24, 2023

(86) PCT No.: PCT/CN2023/096133
§ 371 (c)(1),
(2) Date: Jul. 9, 2024

(87) PCT Pub. No.: WO2024/239293
PCT Pub. Date: Nov. 28, 2024

(65) Prior Publication Data
US 2026/0186572 A1 Jul. 2, 2026

(30) Foreign Application Priority Data
May 22, 2023 (CN) ......................... 202310579365.3

(51) Int. Cl.
*G06F 3/14* (2006.01)
*G02F 1/1333* (2006.01)
(Continued)

(52) U.S. Cl.
CPC .......... *G06F 3/016* (2013.01); *G02F 1/13338* (2013.01); *G06F 3/0362* (2013.01); *G06F 3/038* (2013.01)

(58) Field of Classification Search
CPC ........ G06F 3/016; G06F 3/0362; G06F 3/038; G02F 1/13338
See application file for complete search history.

(56) References Cited

U.S. PATENT DOCUMENTS

2014/0292691 A1* 10/2014 Sugiyama ............. G06F 3/0488 345/173
2018/0239930 A1* 8/2018 Lai .......................... G06F 21/74
(Continued)

FOREIGN PATENT DOCUMENTS

CN 106156664 A 11/2016
CN 107144990 A 9/2017
(Continued)

*Primary Examiner* — Kwang-Su Yang
(74) *Attorney, Agent, or Firm* — ArentFox Schiff LLP; Michael Fainberg

(57) ABSTRACT

Embodiments of the present disclosure disclose a display device and a driving method therefor. The display device includes: a cover plate, including a display region and a peripheral region; a touch display screen, arranged on a non-touch surface of the cover plate and arranged in the display region, where the touch display screen is configured to display a virtual control in a particular region of the display region; an anti-peeping structure, arranged on a side of the touch display screen facing away from the cover plate, where the anti-peeping structure is arranged in at least part of the display region, and the anti-peeping structure is configured to make at least part of the display region in an anti-peeping state under the driving of a control signal; a piezoelectric device.

20 Claims, 7 Drawing Sheets

(51) Int. Cl.

| | |
|---|---|
| ***G06F 3/01*** | (2006.01) |
| ***G06F 3/0362*** | (2013.01) |
| ***G06F 3/038*** | (2013.01) |

(56) References Cited

U.S. PATENT DOCUMENTS

2022/0050314 A1 2/2022 Hsieh et al.
2025/0378711 A1* 12/2025 Jiang .................. G01S 7/52079

FOREIGN PATENT DOCUMENTS

| | | | |
|---|---|---|---|
| CN | 109949736 | A | 6/2019 |
| CN | 209728385 | U | 12/2019 |
| CN | 216052966 | U | 3/2022 |
| CN | 114355653 | A | 4/2022 |
| CN | 114442850 | A | 5/2022 |
| CN | 115857725 | A | 3/2023 |

* cited by examiner

DISPLAY DEVICE AND DRIVING METHOD THEREFOR

CROSS REFERENCE TO RELATED APPLICATIONS

The present application is a National Stage of International Application No. PCT/CN2023/096133, filed on May 24, 2023, which claims priority to Chinese patent application No. 202310579365.3, filed with China National Intellectual Property Administration on May 22, 2023, which are incorporated by reference in their entirety herein.

TECHNICAL FIELD

The present disclosure relates to the field of haptic feedback technology, and in particular to a display device and a driving method therefor.

BACKGROUND

Haptic feedback (Haptics) is the focus of current technological development. Specifically, the haptic feedback can make the terminal interact with the human body through touch.

SUMMARY

Embodiments of the present disclosure provide a display device and a driving method therefor, the solutions are as follows.

Embodiments of the present disclosure provide a display device including: a cover plate, including a display region and a peripheral region; a touch display screen, arranged on a non-touch surface of the cover plate and arranged in the display region, where the touch display screen is configured to display a virtual control in a particular region of the display region; an anti-peeping structure, arranged on a side of the touch display screen facing away from the cover plate, where the anti-peeping structure is arranged in at least part of the display region, and the anti-peeping structure is configured to make at least part of the display region in an anti-peeping state under driving of a control signal; a piezoelectric device, arranged on the non-touch surface of the cover plate and arranged in the peripheral region, where the piezoelectric device is configured to deform under driving of an excitation signal to drive resonance of the cover plate; and a controller, connected with the touch display screen, the anti-peeping structure and the piezoelectric device, respectively, where the controller is configured to, according to a type of a detected virtual control touched by a user, send the excitation signal to the piezoelectric device and send the control signal to the anti-peeping structure.

In a possible implementation, in the above display device provided by the embodiments of the present disclosure, the virtual control is a click button, and the controller is configured to, when the user is detected touching the click button, send the control signal to the anti-peeping structure to control the anti-peeping state of the display region to be on or off.

In a possible implementation, in the above display device provided by the embodiments of the present disclosure, the virtual control is a sliding bar, the controller is configured to, when the user is detected touching a side end of the sliding bar, send the control signal to the anti-peeping structure to control the anti-peeping state of the display region to be an off-state; and the controller is configured to, when the user is detected sliding along an extension direction of the sliding bar, send the control signal to the anti-peeping structure to control a size of the display region in the anti-peeping state to be gradually increased.

In a possible implementation, in the above display device provided by the embodiments of the present disclosure, the virtual control is a sliding bar, the controller is configured to, when the user is detected touching a side end of the sliding bar, send the control signal to the anti-peeping structure to control the anti-peeping state of the display region to be an off-state; and the controller is configured to, when the user is detected sliding along an extension direction of the sliding bar, send the control signal to the anti-peeping structure to control an angle of a visible region of the display region to be gradually decreased.

In a possible implementation, in the above display device provided by the embodiments of the present disclosure, the controller is configured to, when the user is detected sliding along the extension direction of the sliding bar, load an excitation signal with gradually increasing frequency to the piezoelectric device.

In a possible implementation, in the above display device provided by the embodiments of the present disclosure, the controller is configured to, when the user is detected sliding along the extension direction of the sliding bar, load an excitation signal with gradually increasing voltage peak to the piezoelectric device.

In a possible implementation, in the above display device provided by the embodiments of the present disclosure, the sliding bar is a horizontal sliding bar or a vertical sliding bar.

In a possible implementation, in the above display device provided by the embodiments of the present disclosure, the touch display screen is a vehicle-mounted display screen, the touch display screen spans from a vehicle-mounted center console to a right A-pillar; the display region includes a first display region and a second display region, the first display region is close to the center console, and the second display region is close to the right A-pillar; and the first display region is configured to display the virtual control, the second display region is configured to display entertainment information, and the controller is configured to control the anti-peeping state of the second display region through the virtual control.

In a possible implementation, in the above display device provided by the embodiments of the present disclosure, the touch display screen further spans to a left A-pillar, the display region further includes a third display region arranged at a side of the first display region far away from the second display region, and the third display region is configured to display vehicle operation information and navigation information.

In a possible implementation, in the above display device provided by the embodiments of the present disclosure, the touch display screen is a vehicle-mounted display screen, and a number of the touch display screens is two; where a first of the touch display screen is arranged in a position directly facing a vehicle-mounted passenger seat; a second of the touch display screen is arranged in a vehicle-mounted center console or is arranged in a center region of the vehicle-mounted steering wheel; and the first of the touch display screen is provided with the anti-peeping structure, the piezoelectric device is provided in a peripheral region of the second of the touch display screen, and the second of the touch display screen is configured to display the virtual control.

In a possible implementation, in the above display device provided by the embodiments of the present disclosure, the display device further includes: a backlight module arranged on a side of the anti-peeping structure facing away from the cover plate, and a support backplane arranged on a side of the backlight module facing away from the cover plate; where the support backplane is connected with the cover plate, and the piezoelectric device is arranged on the cover plate in a peripheral region of the support backplane.

In a possible implementation, in the above display device provided by the embodiments of the present disclosure, the controller includes a host computer, a control board and a signal amplification circuit; where: the host computer is configured to, according to the type of the detected virtual control touched by the user, send a corresponding trigger signal to the control board; the control board is configured to call a corresponding excitation signal according to the trigger signal, and load the excitation signal to the piezoelectric device through the signal amplification circuit, and meanwhile send the control signal to the anti-peeping structure according to the trigger signal.

Accordingly, embodiments of the present disclosure also provide a driving method for the display device for driving the above-described display device provided by the embodiments of the present disclosure, the driving method includes: detecting touching of the user on the virtual control loading, by the controller, the excitation signal to the piezoelectric device according to the type of the detected virtual control touched by the user to drive deformation of the piezoelectric device to realize haptic feedback on the touch display screen; and meanwhile, sending the control signal to the anti-peeping structure to make at least part of the display region in the anti-peeping state.

In a possible implementation, in the above driving method provided by the embodiments of the present disclosure, the loading the excitation signal to the piezoelectric device according to the type of the detected virtual control touched by the user, further includes: detecting, by a host computer, the type of the virtual control touched by the user, and sending, by the host computer, a corresponding trigger signal to a control board; and calling, by the control board, the corresponding excitation signal according to the trigger signal, and loading, by the control board the excitation signal to the piezoelectric device through a signal amplification circuit.

In a possible implementation, in the above driving method provided by the embodiments of the present disclosure, the virtual control is a click button, and the method further includes: when a host computer detects that the user touches the click button, sending, by the control board, the control signal to the anti-peeping structure to control the anti-peeping state of display region to be on or off.

In a possible implementation, in the above driving method provided by the embodiments of the present disclosure, the virtual control is a sliding bar, and the method further includes: when a host computer detects that a user touches a side end of the sliding bar, sending, by the control board, the control signal to the anti-peeping structure to control the anti-peeping state of the display region to be an off-state; and when the host computer detects that a user slides along an extension direction of the sliding bar, sending, by the control board, the control signal to the anti-peeping structure to control a size of the display region in the anti-peeping state to be gradually increased.

In a possible implementation, in the above driving method provided by the embodiments of the present disclosure, the virtual control is a sliding bar, and the method further includes: when a host computer detects that a user touches a side end of the sliding bar, sending, by the control board, the control signal to anti-peeping structure to control the anti-peeping state of the display region to be an off-state; and when the host computer detects that a user slides along an extension direction of the sliding bar, sending, by the control board, the control signal to the anti-peeping structure to control an angle of an visible region of the display region to be gradually decreased.

In a possible implementation, the above driving method provided by the embodiments of the present disclosure further includes: when the host computer detects that a user slides along the extension direction of the sliding bar, loading, by the control board, an excitation signal with gradually increasing frequency to the piezoelectric device.

In a possible implementation, the above driving method provided by the embodiments of the present disclosure further includes: when the host computer detects that a user slides along the extension direction of the sliding bar, loading, by the control board, an excitation signal with gradually increasing voltage peak to the piezoelectric device.

DETAILED DESCRIPTION

Figure 1:
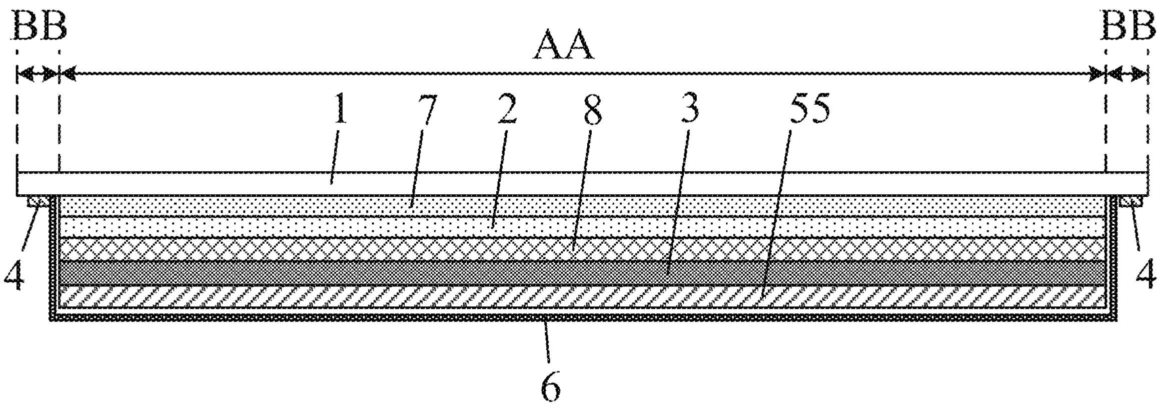
FIG. 1 is a cross-sectional schematic diagram of a display device provided by an embodiment of the present disclosure.

In order to make the purpose, technical solutions and advantages of embodiments of the present disclosure more clear, the technical solutions of the embodiments of the present disclosure will be clearly and completely described below in conjunction with the drawings of embodiments of the present disclosure. Obviously, the described embodiments are some, but not all, of the embodiments of the present disclosure. And the embodiments and features in the embodiments of the present disclosure may be combined with each other without conflict. Based on the described embodiments of the present disclosure, all other embodiments obtained by those of ordinary skill in the art without creative efforts fall within the scope of the present disclosure.

Unless otherwise defined, technical terms or scientific terms used in this disclosure shall have the usual meaning understood by a person with ordinary skill in the art to which this disclosure belongs. Words such as "including" or "comprising" refer to the components or objects that appear before the word, including those listed after the word and their equivalents, without excluding other components or objects. Words such as "connected" or "coupled" are not limited to physical or mechanical connections, but may include electrical connections, whether direct or indirect. Words such as "inside", "outside", "up", "down" are only used to express relative positional relationships. When the absolute position of the described object is changed, the relative positional relationship may also be changed accordingly.

It should be noted that the sizes and shapes of the figures in the drawings do not reflect true proportions and are only intended to illustrate the present disclosure. And, the same or similar reference numbers throughout represent the same or similar components or elements having the same or similar functions.

The screen is the window of the user to obtain external information, in the future more and more vehicle-mounted display screen will be added in the vehicle interiors. The vehicle-mounted display screen is mainly used to display the operation information of the main vehicle, navigation information, control operations such as air conditioning and seats, as well as entertainment information for the passenger. However, the traditional vehicle-mounted display screen does not have anti-peeping effect, and the content of the display screen can also be viewed from the side, so that the driver can also see the screen information used for entertainment for the passenger, which greatly affects the safety of driving.

Therefore, how to design an anti-peeping vehicle-mounted display screen with integrated haptic feedback function is an urgent problem to be solved by the technicians in this field.

Figure 2:
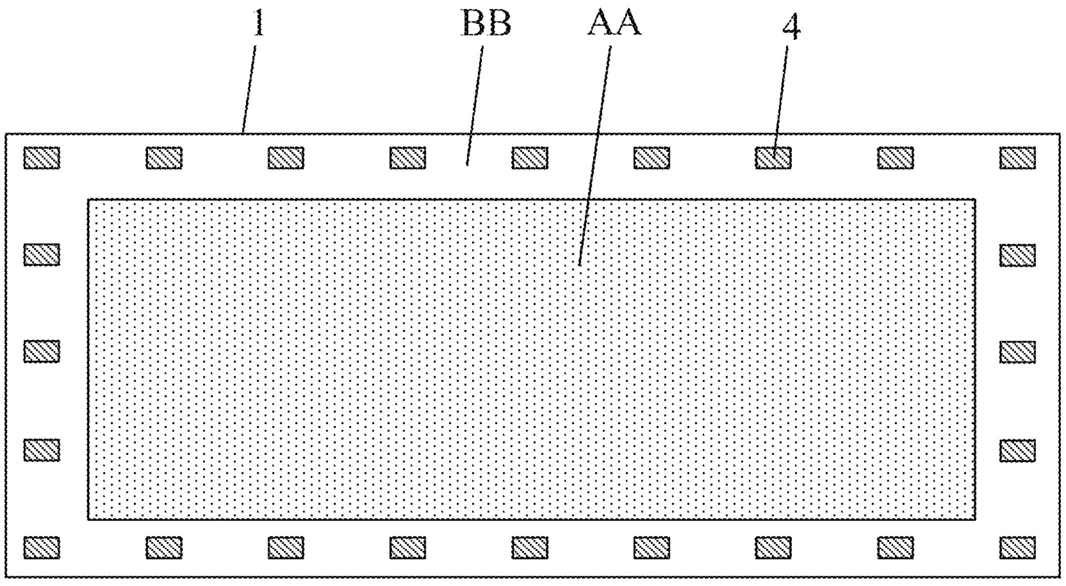
FIG. 2 is a plan schematic diagram of a display device provided by an embodiment of the present disclosure.
Figure 3:
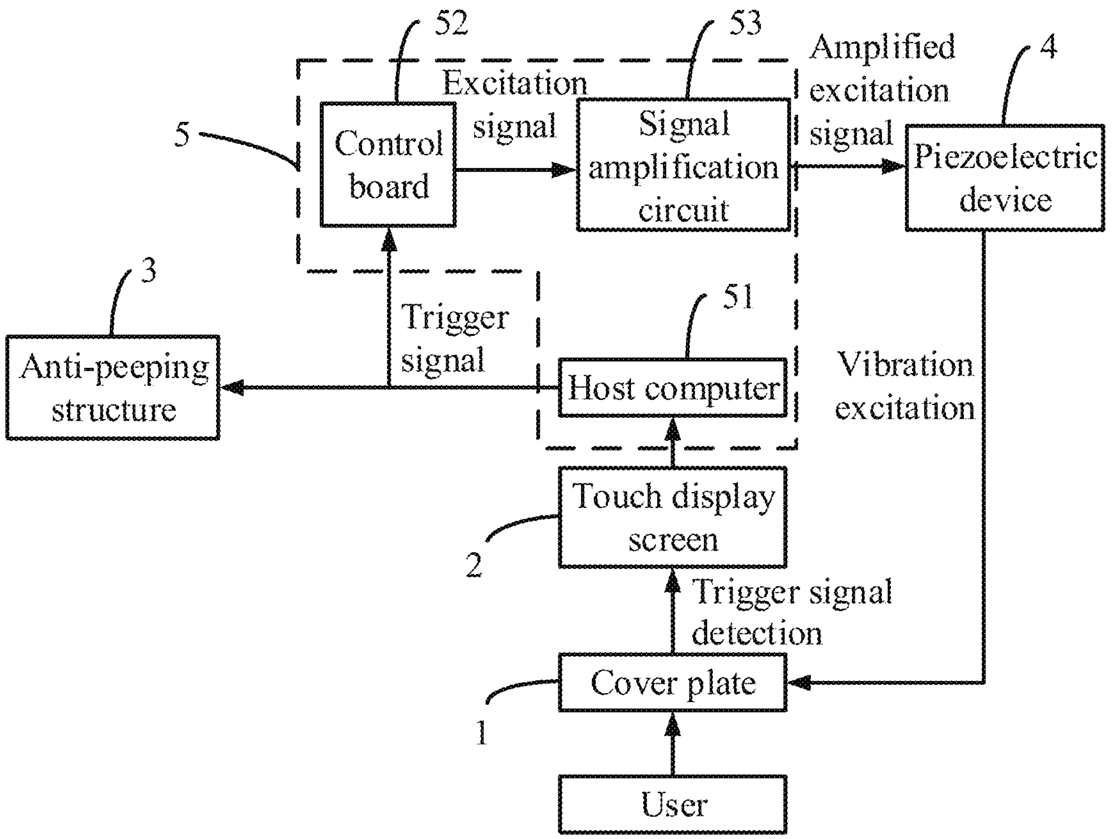
FIG. 3 is a schematic diagram of a connection relationship of various components within a display device provided by an embodiment of the present disclosure.

In view of the above, in order to solve the above technical problems, embodiments of the present disclosure provide a display device, as shown in FIG. 1 to FIG. 3, FIG. 1 is a cross-sectional schematic diagram of a display device, FIG. 2 is a plan schematic diagram of the display device, and FIG. 3 is a schematic diagram of the connection relationship of various components within the display device. The display device includes: a cover plate 1, including a display region AA and a peripheral region BB; a touch display screen 2, arranged on a non-touch surface of the cover plate 1 and arranged in the display region AA, where the touch display screen 2 is configured to display a virtual control in a particular region of the display region AA; an anti-peeping structure 3, arranged on a side of the touch display screen 2 facing away from the cover plate 1, where the anti-peeping structure 3 is arranged in at least part of the display region AA, and the anti-peeping structure 3 is configured to make at least part of the display region AA in an anti-peeping state under the driving of a control signal; a piezoelectric device 4, arranged on the non-touch surface of the cover plate 1 and arranged in the peripheral region BB, where the piezoelectric device 4 is configured to deform under the driving of an excitation signal to drive resonance of the cover plate 1; and a controller 5, connected with the touch display screen 2, the anti-peeping structure 3 and the piezoelectric device 4, respectively, where the controller 5 is configured to, according to a type of a detected virtual control touched by a user, send the excitation signal to the piezoelectric device 5-4 and send the control signal to the anti-peeping structure 3.

The above-described display device provided by the embodiments of the present disclosure can realize the anti-peeping function of the touch display screen by setting an anti-peeping structure in the display region, and can realize the haptic feedback function of the touch display screen by setting the piezoelectric device in the peripheral region, so that when the user touches the virtual control, the excitation signal can be sent to the piezoelectric device according to the type of the virtual control to realize the haptic feedback function, and meanwhile the control signal can be sent to the anti-peeping structure according to the type of the virtual control to control the anti-peeping state of the anti-peeping structure. Therefore, the present embodiments provide an anti-peeping display device that integrates haptic feedback function.

The liquid crystal display belongs to a kind of flat panel display, the advantages of the display is low power consumption, small size, low radiation, and is a relatively mature display screen at present. At present, the vehicle-mounted display device mainly adopts the liquid crystal display. The embodiments of the present disclosure take the use of the liquid crystal display as an example to explain the principle of integrating the haptic feedback function and the anti-Docket peeping function in the display device provided in the disclosed embodiment. Of course, the display device provided in the embodiments of the present disclosure is not limited to the use of a liquid crystal display, nor is it limited to a vehicle-mounted display.

In the specific implementation, the above-described display device provided by the embodiments of the present disclosure, as shown in FIG. 1, further includes a backlight module 55 arranged on a side of the anti-peeping structure 3 facing away from the cover plate 1, and a support backplane 6 arranged on a side of the backlight module 55 facing away from the cover plate 1. The support backplane 6 is connected with the cover plate 1, and the piezoelectric device 4 is arranged on the cover plate 1 in the periphery region of the support backplane 6. Where the cover plate 1 can be connected with the touch display screen 2 by an optical adhesive 7, and the touch display screen 2 can be connected with the anti-peeping structure 3 by the optical adhesive 8.

Optionally, as shown in FIG. 1, the touch display screen 2 can be an in-cell structure or an on-cell structure, which is the same as the structure of the liquid crystal touch display screen in the prior art, which will not be elaborated herein.

In the specific implementation, in the above-described display device provided by the embodiments of the present disclosure, as shown in FIG. 3, the controller 5 includes a host computer 51, a control board 52, and a signal amplification circuit 53.

The host computer 51 is configured to send the corresponding trigger signal to the control board 52 according to the type of the detected virtual control touched by the user. Specifically, when the user conducts touch operation on the interface of a particular region in the display region AA in FIG. 2, the host computer 51 can detect the corresponding virtual control touched by the finger of the user through the touch layer in the touch display screen 2, and then send a corresponding trigger signal to the control board 52.

The control board 52 is configured to call the corresponding excitation signal according to the trigger signal, and load the excitation signal to the piezoelectric device 4 through the signal amplification circuit 53, and meanwhile send the control signal to the anti-peeping structure 3 according to the trigger signal. Specifically, the control board 52 calls the corresponding excitation signal (haptic waveform) according to the trigger signal, and loads the excitation signal (AC voltage signal) to the piezoelectric device 4 (exciter) through the signal amplification circuit 53; and the piezoelectric device 4 deforms to drive the cover plate 1 to resonate, thereby generating the corresponding haptic feedback, and meanwhile the control board 52 sends the control signal to the anti-peeping structure 3 according to the trigger signal to control the anti-peeping state of the anti-peeping structure.

Figure 4:
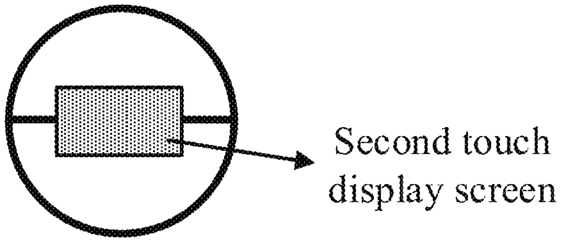
FIG. 4 is a schematic diagram of a touch display screen provided in a center region of a vehicle-mounted steering wheel.

In the specific implementation, in the above display device provided by the embodiments of the present disclosure, as shown in FIG. 1 and FIG. 2, the touch display screen 2 is a vehicle-mounted display screen. When the touch display screen 2 only has a single display region AA, the number of touch display screens 2 in the vehicle can be more than one, e.g., two. The first of the touch display screens 2 can be set in the position directly facing a vehicle-mounted passenger seat, that is, the first of the touch display screens 2 is configured to display the entertainment information for the passenger, and the first of the touch display screens 2 is provided with the anti-peeping structure 3. The second of the touch display screens 2 can be set in a vehicle-mounted center console or is arranged in a center region of the vehicle-mounted steering wheel. The virtual control(s) can be displayed in the display region of the second of the touch display screens 2 and the piezoelectric device(s) 4 can be provided in a peripheral region of the display region. The second of the touch display screens 2 is configured to control the anti-peeping function of the first of the touch display screens 2 through the virtual control(s) and meanwhile realize the haptic feedback function. For example, as shown in FIG. 4, the second of the touch display screens 2 set in the center region of the vehicle-mounted steering wheel is taken as an example.

Figure 5:
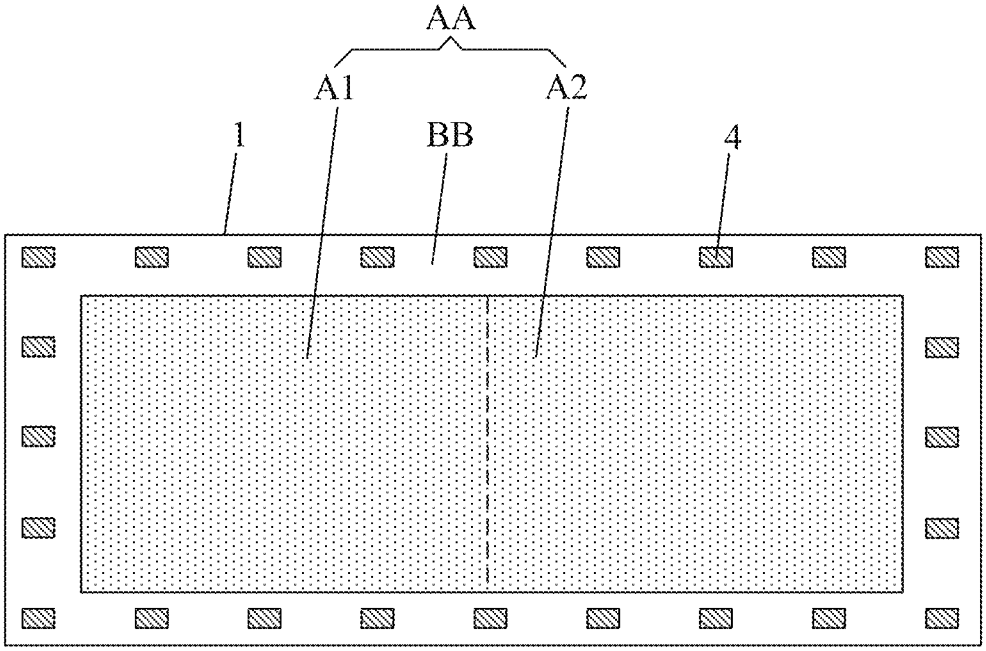
FIG. 5 is a wide screen schematic diagram of a touch display screen that spans from a vehicle-mounted center console to a right A-pillar.

In the specific implementation, in the above display device provided by the embodiments of the present disclosure, as shown in FIGS. 1 and 5, the touch display screen 2 can be a vehicle-mounted display screen, and the touch display screen 2 can be a wide screen spanning from the vehicle-mounted center console to the right A-pillar. The display region AA includes the first display region A1 and the second display region A2, the first display region A1 is close to the center console, and the second display region A2 is close to the right A-pillar.

The first display region A1 can be used to display the virtual control(s), as well as the virtual control operation(s), such as the air conditioning, the seat(s), etc. The second display region A2 can be used to display entertainment information, and the controller 5 is configured to control the anti-peeping state of the second display region A2 through the virtual control displayed in the first display region A1.

Figure 6:
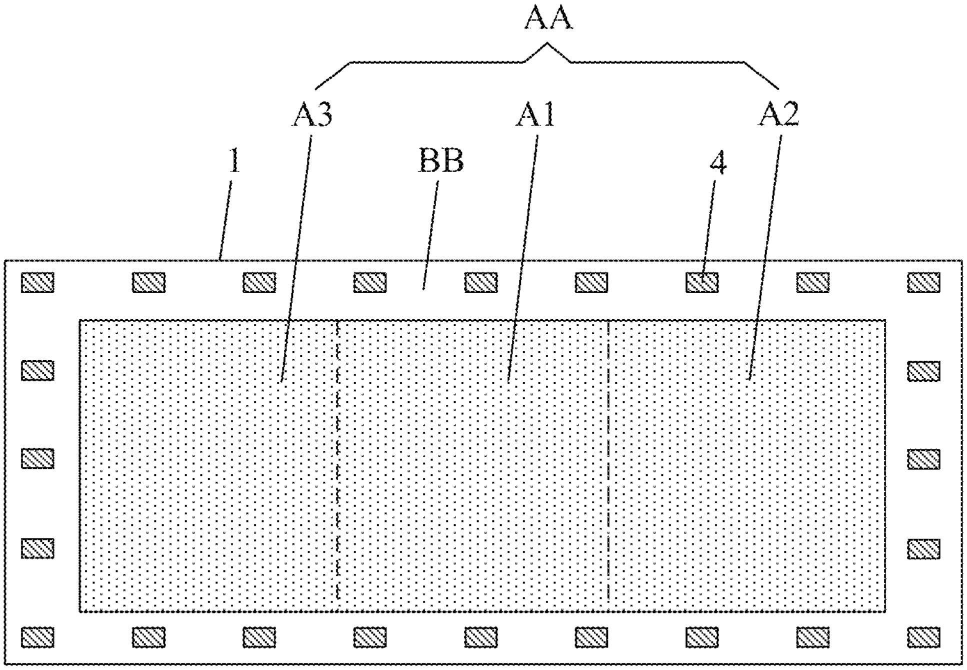
FIG. 6 is a wide screen schematic diagram of a touch display screen that spans from a left A-pillar to a right A-pillar in a vehicle.

In the specific implementation, in the above display device provided by embodiments of the present disclosure, as shown in FIG. 1 and FIG. 6, the touch display screen 2 can also span to the left A-pillar, so that the touch display screen 2 is a wider display screen, so that the display region AA can also include the third display region A3 located at a side of the first display region A1 far away from the second display region A2, the third display region A3 can be used to display vehicle operation information, navigation information, etc.

Specifically, taking the touch display screen 2 shown in FIG. 6, which includes the third display region A3, the first display region A1 and the second display region A2, as an example, considering the driver's driving safety, the second display region A2 needs to realize the side anti-peeping function through the anti-peeping structure 3, the side anti-peeping function can be controlled through the virtual control displayed in the first display region A1. In addition, the first display region A1 and the second display region A2 can integrate the haptic feedback function to improve the haptic experience of human-computer interaction.

Figure 7A:
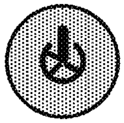
FIG. 7A is a schematic diagram of that a virtual control is a click button.
Figure 7B:
FIG. 7B is a schematic diagram of that a virtual control is a vertical sliding bar.
Figure 7C:
FIG. 7C is a schematic diagram of that a virtual control is a horizontal sliding bar.

Optionally, according to the actual touch operation, the virtual control can be, but is not limited to, a click button and a sliding bar. The sliding bar can be a vertical sliding bar and a horizontal sliding bar. Specifically, as shown in FIG. 7A, the virtual control is a click button; as shown in FIG. 7B, the virtual control is a vertical sliding bar; and as shown in FIG. 7C, the virtual control is a horizontal sliding bar.

Figure 8:
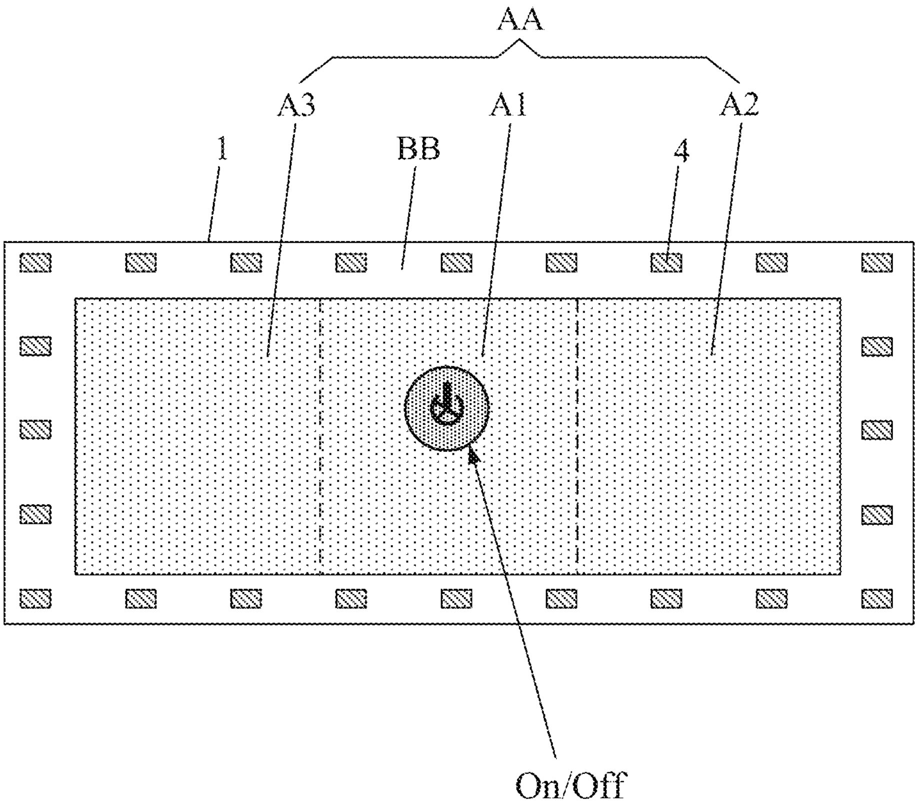
FIG. 8 is a schematic diagram of a click button provided in a first display region of FIG. 6.

In the specific implementation, in the above display device provided by the embodiments of the present disclosure, as shown in FIGS. 3 and 8, the virtual control displayed in the first display region A1 is a click button, and the controller 5 is configured to send a control signal to the anti-peeping structure 3 to control the anti-peeping state of the display region AA to be on or off when the user is detected touching the click button. Specifically, when performing the operation of touching the click button son the interface in the first display region A1, the host computer 51 detects the corresponding button touched by the user's finger through the touch layer in the touch display screen 2, and then sends the click button trigger signal to the control board 52, the control board 52 calls the click button haptic waveform according to the click button trigger signal, and loads the excitation signal to the piezoelectric device 4 through the signal amplification circuit 53, and the piezoelectric device 4 deforms to drive the cover plate 1 to generate vibration, so as to achieve corresponding haptic feedback. Meanwhile, the control board 52 controls the anti-peeping state of the anti-peeping structure 3 according to the click button trigger signal. For example, when touching the click button (On) position, the anti-peeping function of the second display region A2 is turned on; at this time, the driver cannot view the content displayed in the second display region A2. When touching the click button (Off) position again, the corresponding excitation signal is loaded to the piezoelectric device 4 to achieve the haptic feedback, and the anti-peeping function of the second display region A2 is turned off. At this time, the driver can view the content displayed in the second display region A2.

Figure 9:
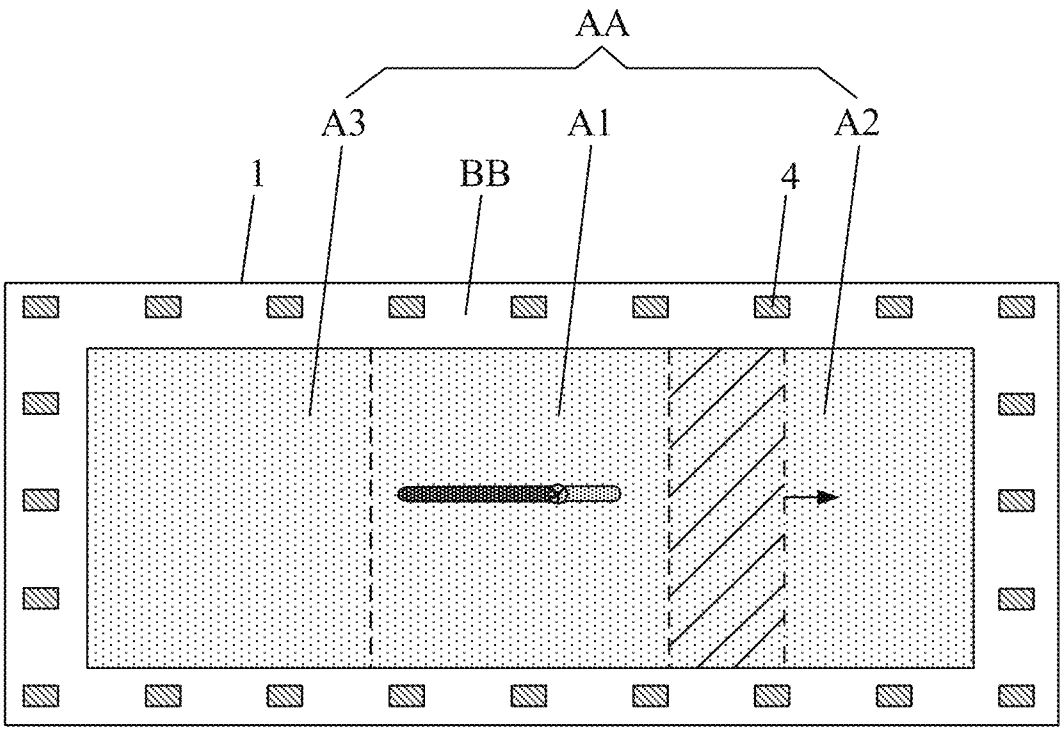
FIG. 9 is a schematic diagram of a horizontal sliding bar provided in a first display region of FIG. 6.

In the specific implementation, in the above display device provided by the embodiments of the present disclosure, as shown in FIGS. 3 and 9, the virtual control displayed in the first display region A1 is a horizontal sliding bar, and the controller 5 is configured to, when the user is detected touching a side end (such as the left end) of the sliding bar, send a control signal to the anti-peeping structure 3 to control the anti-peeping state of the display region (such as the second display region A2) to be the off-state, that is, the second display region A2 does not have an anti-peeping function. The controller 5 is configured to, when the user is detected sliding along the extension direction of the sliding bar (such as sliding to the right), send a control signal to the anti-peeping structure 3 to control the size of the display region (the second display region A2) in the anti-peeping state to be gradually increased (such as the size in the anti-peeping state represented by the shadow part). Specifically, when the user's finger touches the left end of the horizontal sliding bar in the first display region A1, the host computer 51 detects, through the touch control layer in the touch display screen 2, that the user's finger touches the sliding bar, and then sends the trigger signal of left or right sliding to the control board 52, and the control board 52 calls the haptic waveform of left or right sliding according to the trigger signal of left or right sliding, and sends the excitation signal to the piezoelectric device 4 through the signal amplification circuit 53. The piezoelectric device 4 deforms to drive the cover plate 1 to generate vibration. When the finger starts to slide to the right, the touch of the sliding bar can be felt. For example, when the finger is at the left end of the sliding bar, the second display region A2 does not have the anti-peeping function; when the finger slides to the right to a position of 20%, the anti-peeping function of the shadow region of the 20% width on the left side of the second display region A2 in FIG. 9 is turned on, the driver cannot see the content displayed in the region of 20% width on the left side, the anti-peeping function of the region of 80% width on the right side is turned off, and the driver can see the content of the region of 80% width on the right side.

It should be noted that, in FIG. 9, when the finger touches the left end of the horizontal sliding bar, the host computer 51 sends a trigger signal for the left or right sliding to the control board 52. Of course, it can also be that when the finger touches the left end of the sliding bar and the finger begins to slide to the right, the host computer 51 sends a trigger signal for the left or right sliding to the control board 52, and the process of anti-peeping is the same later on.

Of course, the virtual control displayed in the first display region A1 in FIG. 9 can also be a vertical sliding bar. When the user touches the bottom of the vertical sliding bar, the anti-peeping state of the second display region A2 is controlled to be the off-state. When the user slides along the extension direction of the sliding bar (such as sliding upward), the size of the second display region A2 in the anti-peeping state is gradually increased.

In the specific implementation, when the horizontal sliding bar shown in FIG. 9 is configured to control the anti-peeping state of the second display region A2, the frequency of the excitation signal can also be changed according to the change of the position of the finger sliding left or right to prompt the change of the anti-peeping size. For example, when the finger touches the left end of the sliding bar, the host computer 51 detects, through the touch layer in the touch display screen, that the finger touches the sliding bar, and then sends a trigger signal for the left or right sliding to the control board 52. The control board 52 calls the haptic waveform for left or right sliding, e.g., the frequency of the waveform being f1, according to the trigger signal, and loads the excitation signal to the piezoelectric device 4 through the signal amplification circuit 53. The piezoelectric device 4 deforms to drive the cover plate 1 to generate vibration. When the finger starts to slide to the right, the touch of the sliding bar can be felt. In addition, in the present disclosure, an excitation signal with gradually increasing frequency is loaded to the piezoelectric device 4. For example, when the finger slides to the right end, the frequency of the excitation signal is f2, and f2≠f1; when the finger is at the left end of the sliding bar, the anti-peeping function of the second display region A2 is turned off and the second display region A2 does not have the anti-peeping function. When the finger starts to slide to the right, the anti-peeping size (shadow region) is gradually increased, and with the gradually increase of the frequency of the excitation signal, the touch feeling of the finger touching the sliding bar is gradually increased, so that the change of the anti-peeping size can be prompted by gradually increasing the loaded frequency.

In the specific implementation, when the horizontal sliding bar shown in FIG. 9 is configured to control the anti-peeping state of the second display region A2, the voltage peak of the excitation signal can also be changed according to the change of the position of the finger sliding left or right to prompt the change of the anti-peeping size. For example, when the finger touches the left end of the sliding bar, the host computer 51 detects, through the touch layer in the touch display screen, that the finger touches the sliding bar, and then sends a trigger signal for left or right sliding to the control board 52. The control board 52 calls the haptic waveform for left or right sliding, e.g., the voltage peak of the waveform being A1, according to the trigger signal, and loads the excitation signal to the piezoelectric device 4 through the signal amplification circuit 53. The piezoelectric device 4 deforms to drive the cover plate 1 to generate vibration, and when the finger starts to slide to the right, the touch of the sliding bar can be felt. In addition, in the present disclosure, the excitation signal with the gradually increasing voltage peak to the piezoelectric device 4. For example, when the finger slides to the right end, the voltage peak is A2, A2≠A1. When the finger is at the left end of the sliding bar, the anti-peeping function of the second display region A2 is turned off and the second display region A2 does not have the anti-peeping function. When the finger starts to slide to the right, the anti-peeping size (shadow region) is gradually increased, and with the gradually increase of the voltage peak of the excitation signal, the touch feeling of the finger touching the sliding bar is gradually increased, so that the change of the anti-peeping size can be prompted by gradual increasing the voltage peak.

Figure 10:
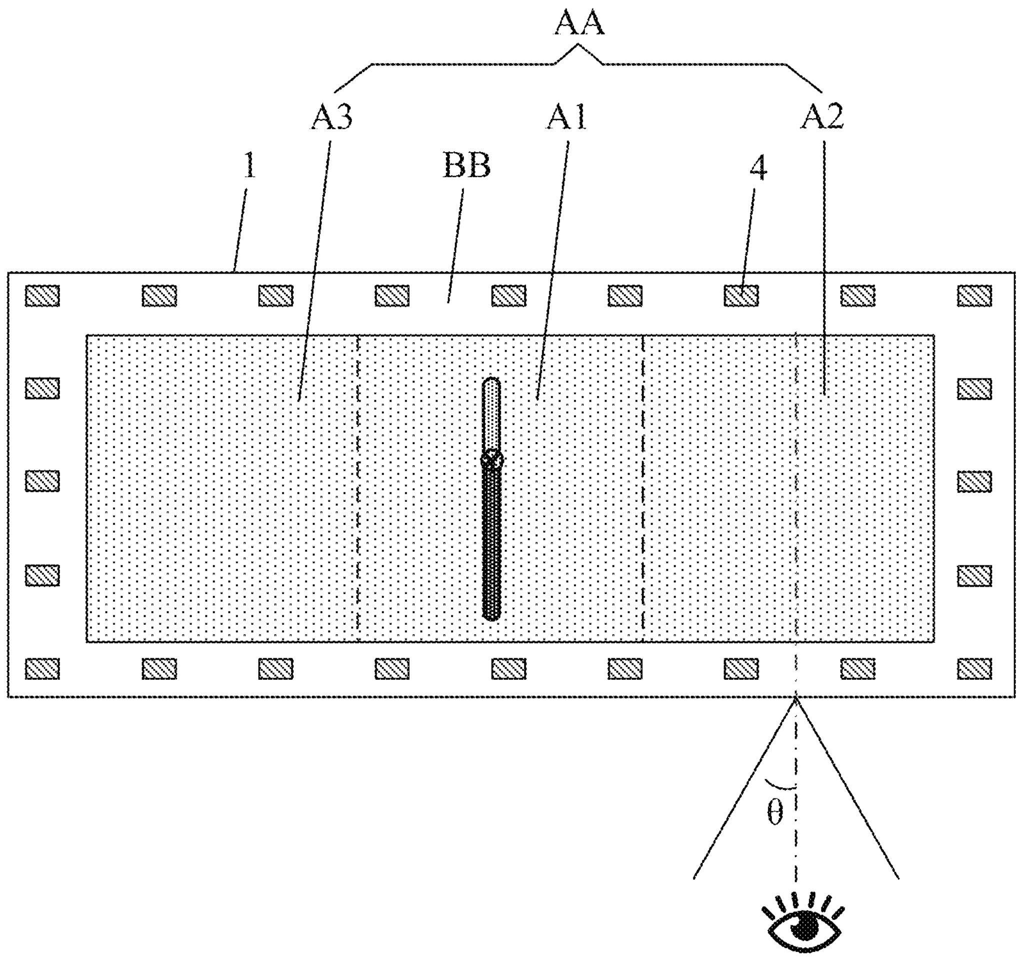
FIG. 10 is a schematic diagram of a vertical sliding bar provided in the first display region of FIG. 6.

In the specific implementation, in the above display device provided by the embodiments of the present disclosure, as shown in FIGS. 3 and 10, the virtual control displayed in the first display region A1 is a vertical sliding bar. The controller 5 is configured to send a control signal to the anti-peeping structure when a user touches the side end (such as the bottom) of the sliding bar, so as to control the anti-peeping state of the display region (such as the second display region A2) to be an off-state. That is, the second display region A2 does not have an anti-peeping function. The controller 5 is configured to, when the user slides along the extension direction of the sliding bar (such as sliding upward), send a control signal to the anti-peeping structure 3 to control an angle θ of a visible region of the display region (the second display region A2) to be gradually decreased. When the angle (i.e., θ) between the user's sight line and the normal of the touch display screen 2 exceeds the angle of the visible region, the content displayed on the screen cannot be seen. Specifically, when the user's finger touches the bottom end of the vertical sliding bar in the first display region A1, the host computer 51 detects, through the touch control layer in the touch display screen 2, that the user's finger touches the sliding bar, and then sends the trigger signal of up or down sliding to the control board 52, the control board 52 calls the haptic waveform of up or down sliding according to the trigger signal of up or down sliding, and sends the excitation signal to the piezoelectric device 4 through the signal amplification circuit 53. The piezoelectric part 4 deforms to drive the cover plate 1 to generate vibration. When the finger starts to slide upward, the touch of the sliding bar can be felt. For example, when the finger is at the bottom of the sliding bar, the angle θ of the visible region of the second display region A2 is 90°, the second display region A2 does not have the anti-peeping function. When the finger starts to slide upward, the angle θ of the visible region is gradually decreased. For example, when the finger slides to 50% of the height of the sliding bar, the angle θ of the visible region is 45°, at this time, when the angle between the user's sight line and the normal of touch display screen 2 is within a range of ±45°, the content displayed in the second display region A2 can be seen. When the finger slides to a position greater than 50% of the height of the sliding bar, the angle of the visible region is less than 45°, at this time when the angle between the sight line and the screen normal is less than ±45°, the screen content cannot be seen by the driver.

It should be noted that, in the above FIG. 10, when the finger touches the bottom of the vertical sliding bar, the host computer 51 sends a trigger signal for the up or down sliding to the control board 52. Of course, it can also be that, when the finger touches the bottom of the sliding bar and the finger starts to slide upward, the host computer 51 sends a trigger signal for the up or down sliding to the control board 52, the process of anti-peeping is the same later on.

Of course, the virtual control displayed in the first display region A1 in FIG. 10 can also be a horizontal sliding bar. When the user touches the left end of the horizontal sliding bar, the anti-peeping state of the second display region A2 is controlled to be an off-state. When the user slides along the extension direction of the sliding bar (such as sliding to the right), the angle θ of the visible region of the second display region A2 is controlled to be gradually decreased. When the angle (i.e., θ) between the user's sight line and the normal of touch display screen 2 exceeds the angle of the visible region, the content displayed on the screen cannot be seen.

In the specific implementation, when the vertical sliding bar shown in FIG. 10 is configured to control the anti-peeping state of the second display region A2, the frequency of the excitation signal can also be changed according to the change of the position of the finger sliding up or down to prompt the change of the angle of the anti-peeping visible region. For example, when the finger touches the bottom of the sliding bar, the host computer 51, through the touch layer in the touch display screen, detects that the finger touches the sliding bar, and then sends a trigger signal of sliding up or down to the control board 52. The control board 52 calls the haptic waveform of sliding up or down, e.g., the frequency of the waveform being f1, according to the trigger signal, and loads the excitation signal to the piezoelectric device 4 through the signal amplification circuit 53. The piezoelectric device 4 deforms to drive the cover plate 1 to generate vibration. When the finger starts to slide upward, the touch of the sliding bar can be felt. In addition, in the present disclosure, an excitation signal with gradually increasing frequency is loaded to the piezoelectric device 4. For example, when the finger slides to the upper end, the frequency of the excitation signal is f2, and f2≠f1. When the finger is at the bottom of the sliding bar, the anti-peeping function of the second display region A2 is turned off and the second display region A2 does not have the anti-peeping function. When the finger starts to slide upward, the angle of the visible region is gradually decreased. When the finger slides to 50% of the height of the sliding bar, the frequency of the excitation signal is (f1+f2)/2, and the angle of the visible region is 45°. At this time, when the angle between the sight line and the normal of the touch display screen is within a range of ±45°, the content displayed in the second display region A2 can be seen. When the finger slides to a position greater than 50% of the height of the sliding bar, the angle of the visible region is less than 45°. At this time, when the angle between the sight line and the screen normal is less than ±45°, the screen content cannot be seen by the driver. Additionally, as the frequency of the excitation signal is gradually increased, the touch feeling of the finger touching the sliding bar is gradually increased, so that the change of the angle of the visible region can be prompted by gradually increasing the loaded frequency.

In the specific implementation, when the vertical sliding bar shown in FIG. 10 is configured to control the anti-peeping state of the second display region A2, it is also possible to change the voltage peak of the excitation signal according to the change of the position of the finger sliding up or down to prompt the change of the angle of the visible region. For example, when the finger touches the bottom of the sliding bar, the host computer 51, through the touch layer in the touch display screen, detects that the finger touches the sliding bar, and then sends a trigger signal of sliding up or down to the control board 52. The control board 52 calls the haptic waveform of sliding up or down, e.g. the voltage peak of the waveform being A1, according to the trigger signal, and loads the excitation signal to the piezoelectric device 4 through the signal amplification circuit 53. The piezoelectric device 4 deforms to drive the cover plate 1 to generate vibration, and the touch feeling of the sliding bar can be felt when the finger starts to slide upward. In addition, in the present disclosure, the excitation signal with the gradually increasing voltage peak is loaded to the piezoelectric device 4. For example, when the finger slides to the upper end, the voltage peak is A2, and A2≠A1. When the finger is at the bottom of the sliding bar, the anti-peeping function of the second display region A2 is turned off and the second display region A2 does not have the anti-peeping function. When the finger starts to slide upward, the angle of the visible region is gradually decreased, and with the increase of the voltage peak of the excitation signal, the touch feeling of the finger touching the sliding bar is gradually increased, so the change of the angle of the visible region can be prompted by gradually increasing the voltage peak.

Specifically, as shown in FIG. 2, in the embodiment of the present disclosure, piezoelectric devices 4 is provided with at the four edges of the peripheral region BB, so that the haptic feedback of each display region can be achieved by triggering the piezoelectric devices 4 corresponding to the first display region A1 and the second display region A2, respectively, and meanwhile all piezoelectric devices 4 can be triggered to achieve the corresponding haptic feedback.

It should be noted that the touch display screen shown in FIG. 5 achieves the anti-peeping function and the haptic feedback function of the same principle as FIG. 6, which will not be repeated herein.

In the specific implementation, the above-described display device provided by the embodiments of the present disclosure may also include other layers known to those skilled in the art, which will not be described in detail herein.

Based on the same inventive concept, embodiments of the present disclosure also provide a driving method for a display device for driving the above-described display device provided by the embodiments of the present disclosure. The driving method including: detecting touching of the user on the virtual control; and loading, by the controller, the excitation signal to the piezoelectric device according to the type of the detected virtual control touched by the user to drive deformation of the piezoelectric device to realize haptic feedback on the touch display screen; and meanwhile, sending the control signal to the anti-peeping structure make at least part of the display region in the anti-peeping state.

The driving method for the above-described display device provided by the embodiments of the present disclosure can realize a anti-peeping display with an integrated haptic feedback function.

In the specific implementation, in the above driving method provided by the embodiments of the present disclosure, the loading the excitation signal to the piezoelectric device according to the type of the detected virtual control touched by the user, further includes: detecting, by a host computer, the type of the virtual control touched by the user, and sending, by the host computer, a corresponding trigger signal to a control board; and calling, by the control board, the corresponding excitation signal according to the trigger signal, and loading, by the control board the excitation signal to the piezoelectric device through a signal amplification circuit.

In the specific implementation, the above specific process of loading the excitation signal to the piezoelectric device according to the type of the virtual control touched by the user can be found in the driving method for the aforementioned display device, which will not be elaborated here.

In the specific implementation, in the above driving method provided by the embodiments of the present disclosure, the virtual control is a click button, the host computer detects that a user touches the click button, the control board sends the control signal to the anti-peeping structure to control the anti-peeping state of display region to be on or off. Specifically, the specific process of controlling the anti-peeping state of the display region by the click button can be found in the driving method for the aforementioned display device, which will not be elaborated here.

In the specific implementation, in the above driving method provided by the embodiments of the present disclosure, the virtual control is a sliding bar. When the host computer detects that a user touches a side end of the sliding bar, the control board sends the control signal to the anti-peeping structure to control that the anti-peeping state of the display region is an off-state; and when the host computer detects that a user slides along an extension direction of the sliding bar, the control board sends the control signal to the anti-peeping structure to control the size of the display region in the anti-peeping state to be gradually increased. Specifically, the specific process of controlling the anti-peeping state of the display region through the sliding bar can be found in the driving method for the aforementioned display device, which will not be elaborated here.

In the specific implementation, in the above driving method provided by the embodiments of the present disclosure, the virtual control is a sliding bar. When the host computer detects that a user touches a side end of the sliding bar, the control board sends the control signal to anti-peeping structure to control that the anti-peeping state of the display region is an off-state; and when the host computer detects that a user slides along an extension direction of the sliding bar, the control board sends the control signal to the anti-peeping structure to control an angle of an visible region of the display region to be gradually decreased. Specifically, the specific process of controlling the anti-peeping state of the display region through the sliding bar can be found in the driving method for the aforementioned display device, which will not be elaborated here.

In the specific implementation, in the above-described driving method provided by the embodiments of the present disclosure, when the host computer detects that a user slides along the extension direction of the sliding bar, the control board loads an excitation signal of gradually increasing frequency to the piezoelectric device. Specifically, the specific process of prompting the anti-peeping state of the control display region by gradually increasing the frequency and the voltage peak can be found in the driving method for the aforementioned display device, which will not be elaborated here.

In the specific implementation, in the above-described driving method provided by the embodiments of the present disclosure, when the host computer detects that a user slides along the extension direction of the sliding bar, the control board loads an excitation signal of gradually increasing voltage peak to the piezoelectric device. Specifically, the specific process of prompting the anti-peeping state of the control display region by gradually increasing the frequency and the voltage peak can be found in the driving method for the aforementioned display device, which will not be elaborated here.

The display device and the driving method therefor in the embodiments of the present disclosure can realize the anti-peeping function of the touch display screen by setting an anti-peeping structure in the display region, and can realize the haptic feedback function of the touch display screen by setting the piezoelectric device in the peripheral region, so that when the user touches the virtual control, the excitation signal can be sent to the piezoelectric device according to the type of the virtual control to realize the haptic feedback function, and meanwhile the control signal can be sent to the anti-peeping structure according to the type of the virtual control to control the anti-peeping state of the anti-peeping structure. Therefore, the present embodiments provide an anti-peeping display device that integrates haptic feedback function.

Although the preferred embodiments of the present disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the disclosure.

Evidently those skilled in the art can make various modifications and variations to the present disclosure without departing from the spirit and scope of the present disclosure. Thus the present disclosure is also intended to encompass these modifications and variations therein as long as these modifications and variations to the present disclosure come into the scope of the claims of the present disclosure and their equivalents.

What is claimed is:

1. A display device, comprising:

a cover plate, comprising a display region and a peripheral region;

a touch display screen, arranged on a non-touch surface of the cover plate and arranged in the display region, wherein the touch display screen is configured to display a virtual control in a particular region of the display region;

an anti-peeping structure, arranged on a side of the touch display screen facing away from the cover plate, wherein the anti-peeping structure is arranged in at least part of the display region, and the anti-peeping structure is configured to make at least part of the display region in an anti-peeping state under driving of a control signal;

a piezoelectric device, arranged on the non-touch surface of the cover plate and arranged in the peripheral region, wherein the piezoelectric device is configured to deform under driving of an excitation signal to drive resonance of the cover plate; and a controller, connected with the touch display screen, the anti-peeping structure and the piezoelectric device, respectively, wherein the controller is configured to, according to a type of a detected virtual control touched by a user, send the excitation signal to the piezoelectric device and send the control signal to the anti-peeping structure.

2. The display device according to claim 1, wherein the virtual control is a click button, and the controller is configured to, when the user is detected touching the click button, send the control signal to the anti-peeping structure to control the anti-peeping state of the display region to be on or off.

3. The display device according to claim 1, wherein: the virtual control is a sliding bar; the controller is configured to, when the user is detected touching a side end of the sliding bar, send the control signal to the anti-peeping structure to control the anti-peeping state of the display region to be an off-state; and the controller is configured to, when the user is detected sliding along an extension direction of the sliding bar, send the control signal to the anti-peeping structure to control a size of the display region in the anti-peeping state to be gradually increased.

4. The display device according to claim 3, wherein the controller is configured to, when the user is detected sliding along the extension direction of the sliding bar, load an excitation signal with gradually increasing frequency to the piezoelectric device.

5. The display device according to claim 3, wherein the controller is configured to, when the user is detected sliding along the extension direction of the sliding bar, load an excitation signal with gradually increasing voltage peak to the piezoelectric device.

6. The display device according to claim 3, wherein the sliding bar is a horizontal sliding bar or a vertical sliding bar.

7. The display device according to claim 1, wherein: the virtual control is a sliding bar; the controller is configured to, when the user is detected touching a side end of the sliding bar, send the control signal to the anti-peeping structure to control the anti-peeping state of the display region to be an off-state; and the controller is configured to, when the user is detected sliding along an extension direction of the sliding bar, send the control signal to the anti-peeping structure to control an angle of a visible region of the display region to be gradually decreased.

8. The display device according to claim 1, wherein: the touch display screen is a vehicle-mounted display screen; the touch display screen spans from a vehicle-mounted center console to a right A-pillar; the display region comprises a first display region and a second display region, the first display region is close to the center console, and the second display region is close to the right A-pillar; and the first display region is configured to display the virtual control, the second display region is configured to display entertainment information, and the controller is configured to control the anti-peeping state of the second display region through the virtual control.

9. The display device according to claim 8, wherein: the touch display screen further spans to a left A-pillar; the display region further comprises a third display region arranged at a side of the first display region far away from the second display region; and the third display region is configured to display vehicle operation information and navigation information.

10. The display device according to claim 1, wherein the touch display screen is a vehicle-mounted display screen, and a number of the touch display screens is two, wherein a first of the touch display screens is arranged in a position directly facing a vehicle-mounted passenger seat, a second of the touch display screens is arranged in a vehicle-mounted center console or is arranged in a center region of the vehicle-mounted steering wheel, and the first of the touch display screens is provided with the anti-peeping structure, the piezoelectric device is provided in a peripheral region of the second of the touch display screens, and the second of the touch display screens is configured to display the virtual control.

11. The display device according to claim 1, further comprising: a backlight module arranged on a side of the anti-peeping structure facing away from the cover plate, and a support backplane arranged on a side of the backlight module facing away from the cover plate, wherein the support backplane is connected with the cover plate, and the piezoelectric device is arranged on the cover plate in a peripheral region of the support backplane.

12. The display device according to claim 1, wherein the controller comprises a host computer, a control board and a signal amplification circuit, and wherein:

the host computer is configured to, according to the type of the detected virtual control touched by the user, send a corresponding trigger signal to the control board; and the control board is configured to call a corresponding excitation signal according to the trigger signal, and load the excitation signal to the piezoelectric device through the signal amplification circuit, and meanwhile send the control signal to the anti-peeping structure according to the trigger signal.

13. A driving method for the display device, configured for driving the display device according to claim 1, comprising:

detecting touching of the user on the virtual control; and loading, by the controller, the excitation signal to the piezoelectric device according to the type of the detected virtual control touched by the user to drive deformation of the piezoelectric device to realize haptic feedback on the touch display screen; and meanwhile, sending the control signal to the anti-peeping structure to make at least part of the display region in the anti-peeping state.

14. The driving method according to claim 13, wherein the loading, by the controller, the excitation signal to the piezoelectric device according to the type of the detected virtual control touched by the user, and the driving method further comprises:

detecting, by a host computer, the type of the virtual control touched by the user, and sending, by the host computer, a corresponding trigger signal to a control board; and calling, by the control board, the corresponding excitation signal according to the trigger signal, and loading, by the control board the excitation signal to the piezoelectric device through a signal amplification circuit.

15. The driving method according to claim 13, wherein the virtual control is a click button, and the driving method further comprises: when a host computer detects that the user touches the click button, sending, by the control board, the control signal to the anti-peeping structure to control the anti-peeping state of display region to be on or off.

16. The driving method according to claim 13, wherein the virtual control is a sliding bar, and the driving method further comprises:

when a host computer detects that a user touches a side end of the sliding bar, sending, by the control board, the control signal to the anti-peeping structure to control the anti-peeping state of the display region to be an off-state; and when the host computer detects that a user slides along an extension direction of the sliding bar, sending, by the control board, the control signal to the anti-peeping structure to control a size of the display region in the anti-peeping state to be gradually increased.

17. The driving method according to claim 16, further comprising:

when the host computer detects that a user slides along the extension direction of the sliding bar, loading, by the control board, an excitation signal with gradually increasing frequency to the piezoelectric device.

18. The driving method according to claim 16, further comprising:

when the host computer detects that a user slides along the extension direction of the sliding bar, loading, by the control board, an excitation signal with gradually increasing voltage peak to the piezoelectric device.

19. The driving method according to claim 13, wherein the virtual control is a sliding bar, and the driving method further comprises:

when a host computer detects that a user touches a side end of the sliding bar, sending, by the control board, the control signal to anti-peeping structure to control the anti-peeping state of the display region to be an off-state; and when the host computer detects that a user slides along an extension direction of the sliding bar, sending, by the control board, the control signal to the anti-peeping structure to control an angle of an visible region of the display region to be gradually decreased.

20. The driving method according to claim 19, further comprising:

when the host computer detects that a user slides along the extension direction of the sliding bar, loading, by the control board, an excitation signal with gradually increasing frequency to the piezoelectric device.

* * * * *